United States Patent [19]

Tancs

[11] Patent Number: 4,555,997
[45] Date of Patent: Dec. 3, 1985

[54] SEMI-AUTOMATIC SEWING MACHINE CONTROL SYSTEM

[75] Inventor: Tibor L. Tancs, Roselle Park, N.J.

[73] Assignee: The Singer Company, Stamford, Conn.

[21] Appl. No.: 615,013

[22] Filed: May 29, 1984

[51] Int. Cl.$^4$ .............................................. D05B 19/00
[52] U.S. Cl. .............................. 112/121.11; 112/163; 112/275
[58] Field of Search ...................... 112/121.11, 121.12, 112/2, 163, 275, 277, 262.1, 262.3

[56] References Cited

U.S. PATENT DOCUMENTS

| | | |
|---|---|---|
| 3,613,608 | 10/1971 | Hinerfeld et al. ...................... 112/2 |
| 3,827,381 | 8/1974 | Baanstra et al. ............... 112/121.11 |
| 4,104,976 | 8/1978 | Landau, Jr. et al. ........... 112/121.11 |
| 4,178,862 | 12/1979 | Bianchi et al. .................. 112/121.11 |
| 4,226,197 | 10/1980 | Pollmeier et al. .............. 112/121.11 |
| 4,391,215 | 7/1983 | Sansone ................................ 112/275 |
| 4,403,558 | 9/1983 | Martell et al. .................. 112/121.11 |

Primary Examiner—Peter Nerbun
Attorney, Agent, or Firm—Robert E. Smith; Edward L. Bell

[57] ABSTRACT

A semi-automatic sewing machine control system responsive to successive signals from a sensor, such as a ply edge detector, influences in predetermined sequence a series of selected machine operations. This system accommodates interchangeably any variety of work sizes provided that the same sequence of sewing machine operations is involved.

5 Claims, 4 Drawing Figures

SEMI-AUTOMATIC SEWING MACHINE CONTROL SYSTEM

BACKGROUND OF THE INVENTION

This invention is in the field of industrial sewing machines, and more particularly, relates to a control system adapting for semi-automatic operation an industrial sewing machine of the type having basic manual controls.

While it is possible for a skilled industrial sewing machine operator to manipulate the basic manual controls of a sewing machine as well as to guide work fabrics in the stitching of practically any sewn product, the degree of manual skill and the level of coordination required for many sewing operations makes such purely manual control undesirable. Not only is such purely manual control unduely fatiguing for an operator, but also detrimental to the uniformity of the resulting stitched products and conducive to low productivity.

There have been numerous prior efforts in the sewing machine art to relieve the sewing machine operator of the necessity manually to control various aspects of sewing machine operation. For example, needle positioners have been developed which obviate manual inching of the sewing machine by providing a means for positioning the needle responsive to either an operator influenced signal or to a preestablished control setting. Similarly, thread trimming at the completion of sewing operation has been automated, and it is known to perform auxiliary operations such as raising the presser foot automatically.

While these prior efforts have reduced the degree of manual control required of a sewing machine operator, they have none-the-less required a continuous sequence of operator influence for the sewing of a multiple seam sequence which imposes a high level of coordination on the operator and consequently slows productivity and introduces variation in the resulting sewn products.

INFORMATION DISCLOSURE STATEMENT

The most pertinent prior art of which I am aware is in prior efforts which have been devoted to committing the complete sequence of sewing machine controls to a stitch count related memory with a view toward providing completely automated sewing machine control of a sewing operation leaving only work manipulation to the sewing machine operator. U.S. Pat. Nos. 3,613,608, Oct. 19, 1971, Hinerfeld et al, and 4,104,976, Aug. 8, 1979, Landau et al, are examples of such memory based units. The problem with such memory based units is the complexity of preparatory measures required in view of the fact that each different size of a garment or stitched article must be separately recorded or otherwise committed to the memory, and the proper size information must always be recalled from the memory for each different sewing operation.

SUMMARY OF THE INVENTION

There are many repetitive sewing operations which involve a sequence of stitched seam segments and in which the transition between the successive seam segments must occur with predetermined relationship to an identifiable characteristic of the material being stitched. Attaching of a fabric panel such as a pocket or label, for example, requires a succession of stitched seam segments with transitions at a uniform distance from each sharp corner, culminating with a termination in which the sewing threads are severed and the finished stitched article is released for removal from the sewing machine.

It is an object of this invention to provide a control system for adapting a sewing machine of the type equipped with basic manual controls for the performance of a sequence of stitched seam segments without operator influence or resort to storage in memory of stitch count related data, but responsive only to sensed characteristics of the material being stitched. This object of the invention is attained by the novel combination of fabric sensing means on a sewing machine together with means for providing a plurality of different automatically effective sewing machine operations and an operation controller preselectable by the sewing machine operator for dictating a predetermined sequence of the different automatically effective sewing machine operations in response to successive signals from the fabric sensing means.

The result is an exceedingly simple and cost effective system which may be applied to almost any conventional sewing machine with basic manual controls, which may be programmed by simply setting one or two selector switches without commiting to memory any data related to the length or stitch count of the various seam segments, and which provides for automatic operation throughout a complete range of size variation for any given sewing operation.

DESCRIPTION OF THE DRAWINGS

The foregoing will be more readily apparent upon reading the following description of a preferred embodiment of this invention in conjunction with the accompanying drawings in which.

DETAILED DESCRIPTION

Figure 1:
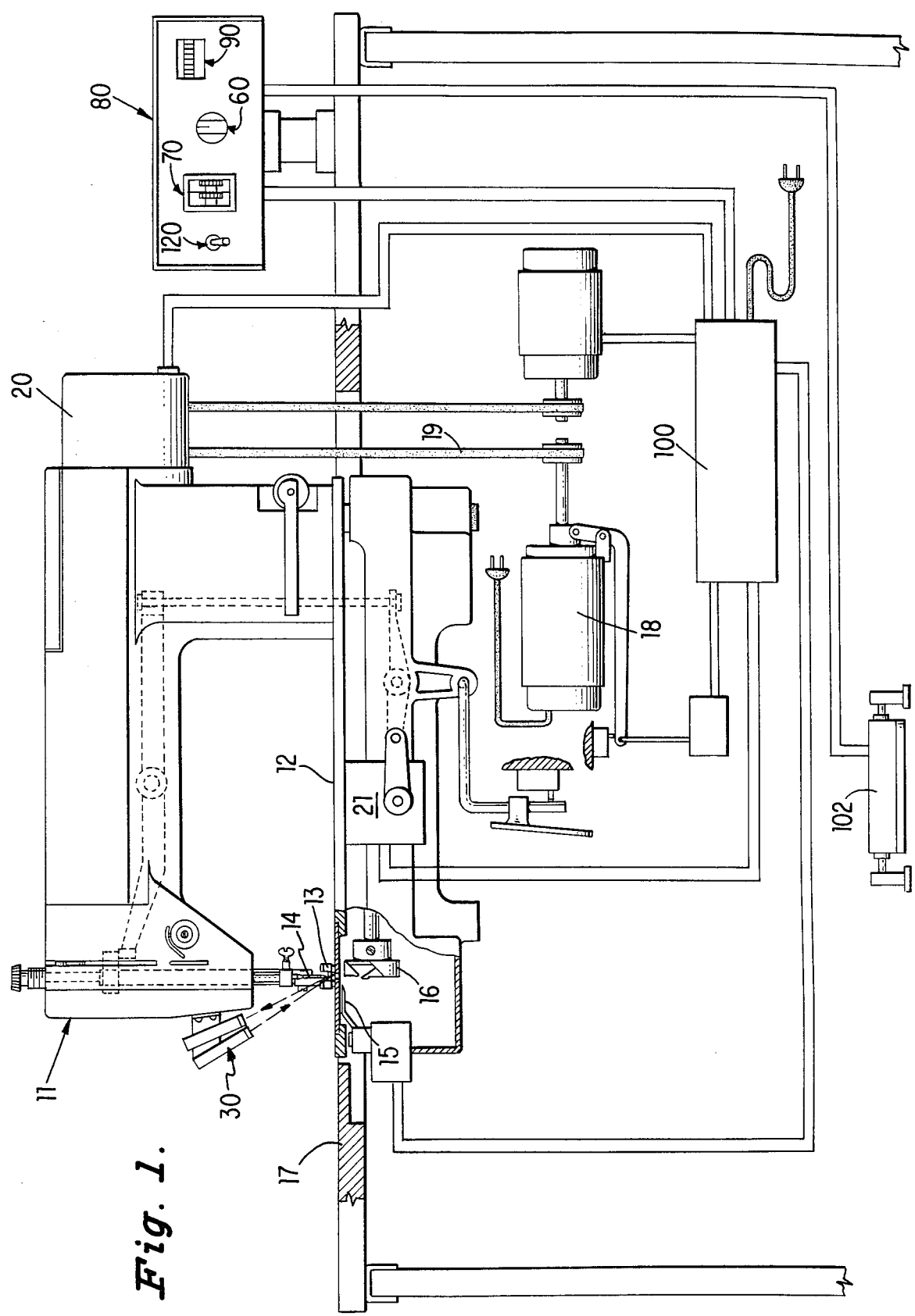
FIG. 1 is a schematic diagram illustrating a sewing machine equipped with appurtenances including a drive with needle positioner, thread trimming mechanism, a presser lifting mechanism and work sensing means together with an operator controller in accordance with this invention.

Referring to FIG. 1 of the drawings, 11 indicates a conventional industrial sewing machine including a work supporting bed 12, a presser device 13 for urging work fabric in opposition to a work feeding mechanism (not shown) in the bed, an endwise reciprocable needle 14 and an underbed thread trimming mechanism 15 associated with a loop taker 16 beneath the bed.

The sewing machine 11 is preferably supported on a power table top 17 beneath which is suspended a transmitter 18 for driving the sewing machine. The transmitter drives the sewing machine by way of a belt 19 and a clutch and timer unit 20. The sewing machine drive system is preferably of the type adapted automatically to position the needle 14 in a predetermined position of reciprocation in the stopped position of the sewing machine. For a detailed description of the transmitter and needle positioning device, the U.S. Pat. No. 2,942,564, June 28, 1960 of Larys et al, which is incorporated herein by reference, may be referred to.

The U.S. Pat. No. 3,386,402, June 4, 1968 of Ross, which is incorporated herein by reference, includes a detailed description of an underbed thread trimming mechanism in association with a sewing machine loop taker and work feeding mechanism of the type which may be utilized advantageously in the present invention. Similarly, an electrically operable presser lifting mechanism including an actuator 21 suitable for use with the present invention is disclosed in the U.S. Pat. No. 3,084,640, Apr. 9, 1963 of Hayes et al, and is incorporated herein by reference.

Mounted on the sewing machine 11 is a work fabric detection means 30 which may take the form of a self-compensating optoelectronic ply and edge detector such as is disclosed in U.S. Pat. No. 4,391,215, July 5, 1983 of Sansone which is incorporated herein by reference. The fabric detection means 30 is arranged to maintain surveillance of the work fabrics immediately in front of the presser device 13 and needle 14 considered in the direction in which the work fabrics are advanced to the needle by the work feeding mechanism. The fabric detection means 30 is arranged to provide a signal in response to each sensing of a predetermined characteristic of the work fabric. The predetermined characteristic may be a change in the number of fabric plies, including the sensing of an edge of a single fabric ply, or a change of fabric color, or the sensing of a purposely applied mark applied to the work fabric.

Figure 4:
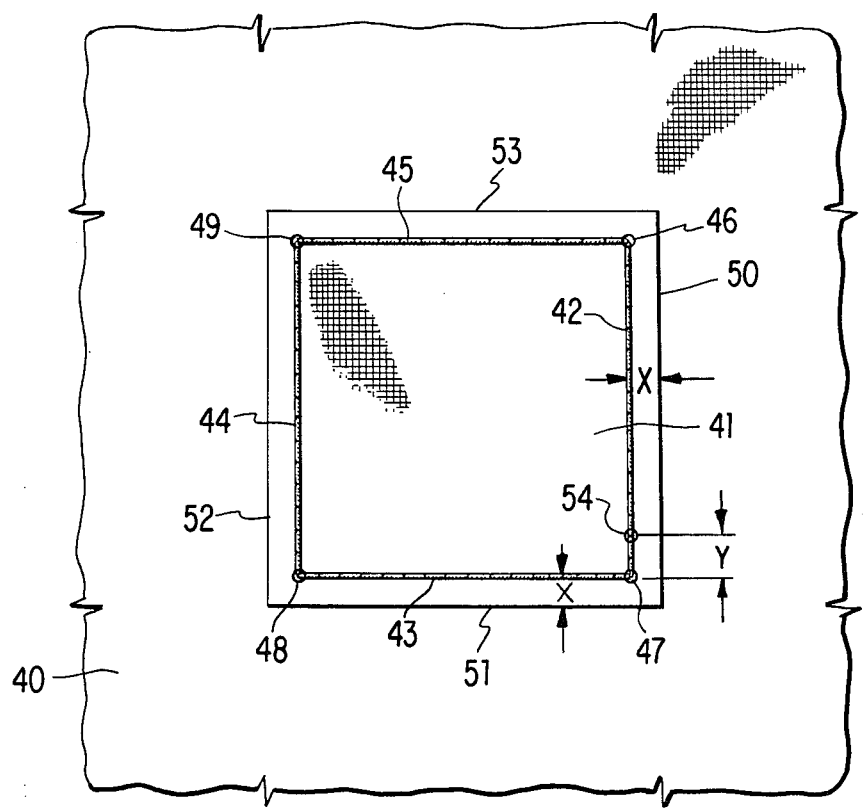

Referring to FIG. 4, a specific sewn article is disclosed which is typical in its stitching requirements to a large number of sewing tasks and which may be accomplished advantageously by the use of a preferred form of this invention. The article illustrated in FIG. 4 comprises a base fabric ply 40 to which another ply of fabric 41 is secured by seam segments 42, 43, 44, and 45. Each of the seam segments 42-45 extends substantially a uniform distance X from the edge of the fabric ply 41 and the beginning and termination of each of the seam segments, as indicated by the corners 46, 47, 48 and 49 must, therefore, be located substantially at the distance X from the respective edges 50, 51, 52 and 53 of the fabric ply 41.

To accomplish the stitching of the above described stitched article in a semi-automatic fashion, that is, without the necessity for the operator to make any change whatever of any of the sewing machine controls, the following combination of instrumentalities and organization thereof is required in accordance with this invention.

Figure 2:
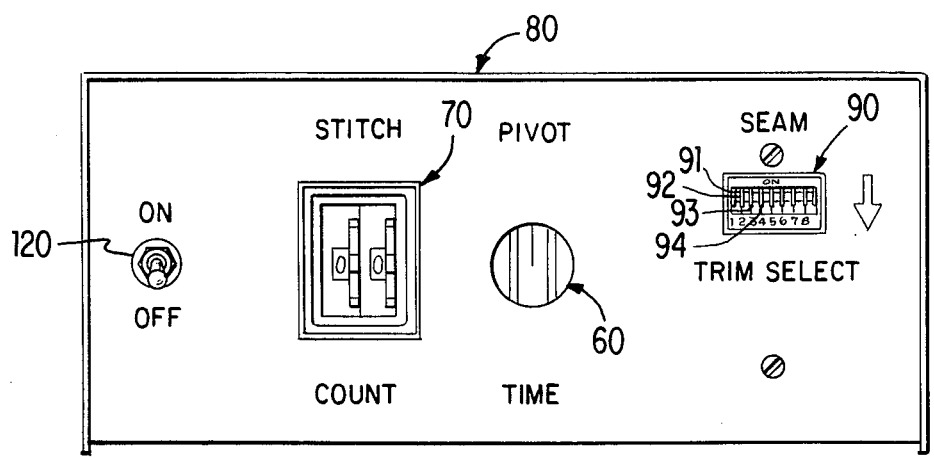
FIG. 2 is an enlarged elevational view of the operation controller.

The appurtenances to the sewing machine 11 as described above must be organized so as to provide for two different automatically effective operational sequences. The first automatically effective operational sequence, which may be termed a pivot delay, includes operation of the needle positioner to stop the sewing machine with the needle down, lifting of the presser foot for a predetermined time, lowering of the presser foot, and finally reengagement of the sewing machine drive. A control 60 as shown in FIG. 2 is preferably provided whereby the time that the presser foot remains elevated may be preselected to match the time required by an individual sewing machine operator to effect turning of the work. The second automatically effective operational sequence, which may be termed a trim and lockout, involves operation of the needle positioner and thread trimming mechanism in concert to trim the sewing threads and stop the sewing machine with the needle up followed by an operation of the presser lifter but without automatic reengagement of the sewing machine drive.

The invention also requires in combination with the different automatically effective operational sequences, such as the two described above, the work fabric detecting means 30. Preferably the detecting means 30 is arranged to detect a fabric characteristic, such as a fabric ply change, at a distance Y from the sewing needle which, as illustrated in FIG. 4, is greater than the distance X. A control 70 is preferably provided for delaying the application of the signal from the work fabric detecting means for a preselected number of stitches of the sewing machine so that the distance X of the corners 47, 48, 49 and 46 from the respective fabric edges may be regulated.

One additional requirement in the combination of the present invention is an operational controller 80 by which the sewing machine operator may preselect the specific automatic responses desired including which of the different automatically effective operational sequences will occur in response to each successive signal generated by the work fabric detecting means.

In the preferred embodiment the operational controller includes a numbered set of double throw switches, 90 arranged electrically, as will be described in detail hereinbelow, to be rendered effective in seriatim in response to work fabric detection signals. Each of the set of switches 90 when shifted to the top as shown in FIG. 2 is effective to initiate the first or pivot delay sequence and is effective when shifted to the bottom to initiate the second or trim and lock-out sequence.

Where only two different operational sequences are involved and actuation of the second terminates the process, the numbered set of switches 90 may be utilized in the system somewhat differently, that is, simply as a means for operator identification of the instance in the sequence at which the terminating operation is desired. In this mode, only one of the switches 90 need be closed and the order of the closed switch in the bank of switches determines which operation in the sequence of operations will be of the second or terminating type of operation.

Before describing in detail an electrical circuit for operationally interrelating the above described instrumentalities, a general description of the steps necessary to prepare the above described combination for producing the stitching sequence illustrated in FIG. 4, and a general description of the overall operation of the combination will assist in an understanding of the detailed circuit description.

Considering the stitching sequence shown in FIG. 4, to begin at point 46 and to proceed in succession to corners 47, 48, 49 and terminate at 46, the operator would shift the first three switches 91, 92, 93 of the set of switches 90 to the top to dictate three successive pivot delays at corners 47, 48, and 49. The fourth switch 94 would be set to the bottom to dictate a trim and lock-out at the fourth corner 46. The pivot delay time would be set by the control 60 commensurate with the difficulty of work manipulation and the skill of the operator, and the control 70 would be set so as to provide for the desired spacing X of the stitched seam from the edge of fabric panel 41. With these three simple settings the unit is ready for semi-automatic operation.

For each sewing sequence, the operator inserts the work pieces beneath the sewing machine presser foot with the needle disposed in location 46, initiates operation of the transmitter to start the sewing process and thereafter simply guides and turns the work piece as required. No operator influenced change is required in any transmitter or sewing machine control throughout the entire sewing sequence. As the work fabric detector 30 senses the fabric ply edge 51 the pivot delay sequence will be triggered automatically to occur at corner 47 during which the operator turns the work in preparation for the sewing of the seam segment 43. A similar cornering operation will occur at corners 48 and 49; and at 46 the operational controller will dictate a trim and lockout operation and sewing will cease with the machine in condition for the finished work piece to be removed. The circuit, as will be described below, is preferably arranged such that occurrence of a trim and lock-out operation not only terminates the semi-automatic operation sequence, but also effects a return to the beginning of the controlled sequence when operation of the sewing machine transmitter is again initiated by the sewing machine operator.

DETAILED DESCRIPTION OF THE CIRCUIT FOR THE PREFERRED EMBODIMENT

Figure 3:
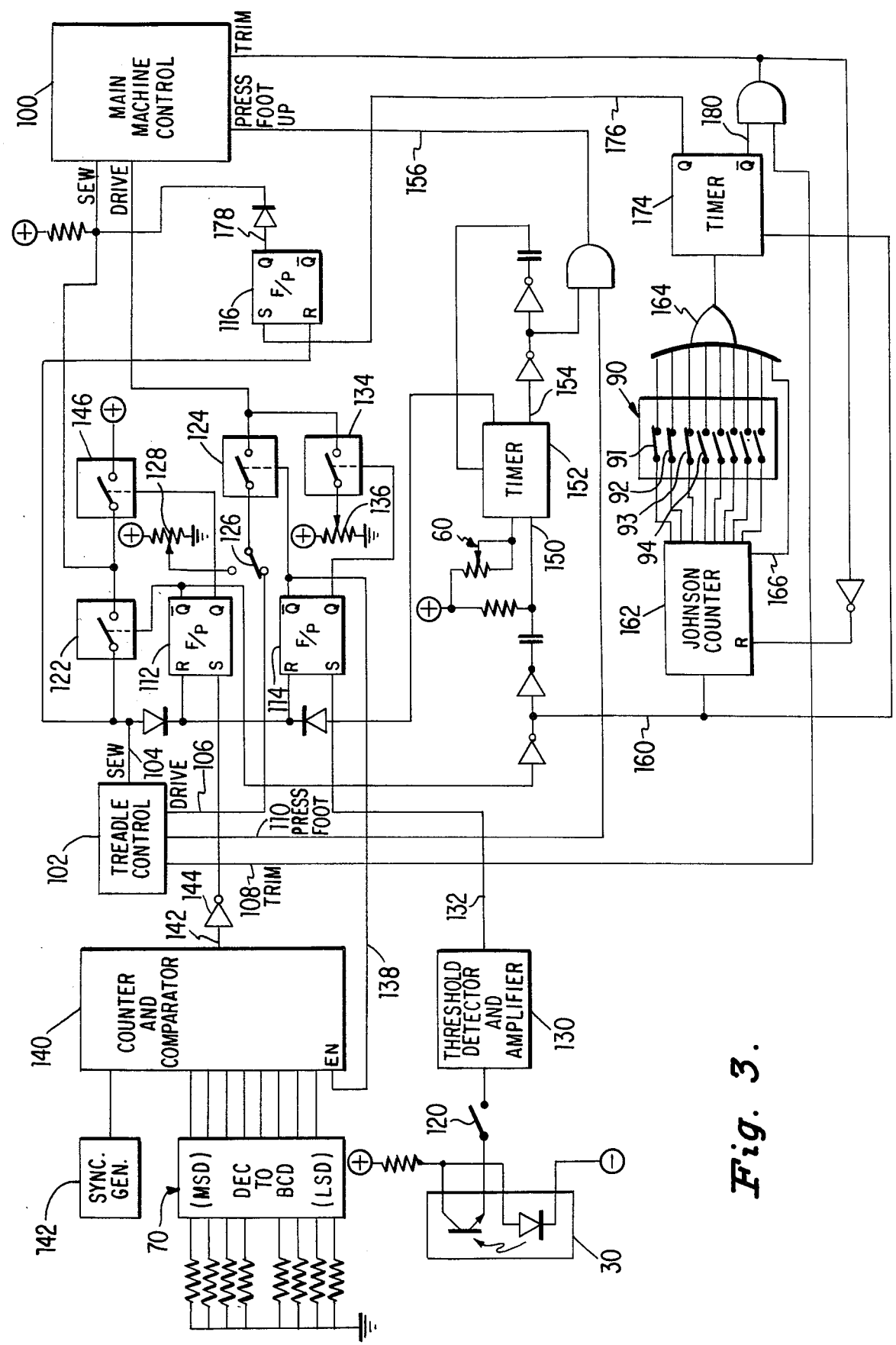
FIG. 3 is an electrical schematic diagram indicating the manner in which the operation controller and the sewing machine appurtenances are related in the preferred embodiment of this invention; and, FIG. 4 is a plan view of a fragment of a stitched article indicating the type of stitching sequence of which this invention is capable of accomplishing in semiautomatic fashion.

Referring now to FIG. 3, shown therein is a schematic diagram of electrical circuitry incorporating the principles of this invention. This circuitry is intended to be incorporated in an industrial sewing machine system such as that disclosed in U.S. Pat. No. 4,154,179, the contents of which are hereby incorporated by reference as if fully set forth herein. Accordingly, the industrial sewing machine system includes a main machine control 100 which responds to various input signals for sequencing the sewing system through a plurality of internal states and generates output signals for controlling the sewing machine and various devices associated therewith. One of the input devices is a treadle control 102. As is well known, a treadle for an industrial sewing machine may be depressed in a forward direction (toed) by the operator to cause the sewing machine to run and may be heeled by the operator to cause the sewing machine to stop, perform a back tack operation, and/or a thread trimming operation. Thus, when the operator toes the treadle, the treadle control 102 places a low signal on the SEW command lead 104. The amount of depression of the treadle, indicating the operator desired speed, results in a variable voltage impressed on the DRIVE signal lead 106. When the operator heels the treadle, a low signal is impressed on the lead 108. Additionally, the treadle control 102 is shown as providing a presser foot lift signal on the lead 110, when so signaled by the operator.

The initial state of the circuitry shown in FIG. 3 is with the flip flops 112, 114 and 116 all being reset so that their Q outputs are low and their $\overline{Q}$ outputs are high. Assuming that the operator is to sew an article of the type illustrated in FIG. 4, the switches 90 must be set so that the first three switches 91, 92 and 93 are closed to indicate that at the corners 47, 48 and 49 there is to be a pivot delay and the switch 94 must be opened to indicate that at the final corner 46 there is to be a trim function. Additionally, the stitch count switches 70, which comprise a decimal to binary coded decimal convertor, must be set to indicate the number of stitches in the distance Y between the point 54 where the ply edge 51 is sensed by the sensor 30 and the corner 47.

After this is done, the operator need only close the switch 120, insert the work fabric in the machine, toe the treadle and guide the work.

When the operator toes the treadle and a low signal is applied to the lead 104, since the flip flop 112 is in its reset state with its $\overline{Q}$ output high, the switch 122 is closed so that the SEW command signal is transmitted to the main machine control 100. Similarly, the switch 124 is closed. The input to the switch 124 is the switch 126 through which the operator can select either a preset speed via the potentiometer 128 or the speed selected by the amount of depression of the treadle, which results in a signal on the DRIVE lead 106. Whichever drive signal is chosen, this signal is transmitted through the switch 124 to the main machine control 100. The sewing machine then begins sewing the seam 42.

At the point 54 where the sensor 30 detects the ply edge 51, the threshold detector and amplifier circuit 130 provides a positive pulse on the lead 132, causing the flip flop 114 to be set. This causes the switch 124 to be opened and the switch 134 to be closed. The drive signal to the main machine control 100 is then provided by the potentiometer 136, which has been preset in accordance with a desired positioning speed. With the flip flop 114 reset, a low signal at the $\overline{Q}$ output is transmitted over the lead 138 to enable the counter and comparator circuit 140. The input to the circuit 140 is from a synchronization generator 142 which provides a pulse each time the needle is down. The circuit 140 then counts the stitches after the point 54 and when the number of stitches after the point 54 is equal to the number of stitches preset into the switches 70, a low pulse is provided on the lead 142. This low pulse is inverted by the inverter circuit 144 and utilized to set the flip flop 112.

When the flip flop 112 is set, this causes the switch 122 to be opened and the switch 146 to be closed. Therefore, a high voltage is applied to the sew command input of the main machine control 100, thereby causing the sewing machine to stop. At the same time, when the $\overline{Q}$ output of the flip flop 112 goes low, a pulse is transmitted to the input 150 of the timer 152. The timer 152 times a period selected in accordance with the setting of the potentiometer 60. This corresponds to the pivot delay time set by the operator. During the duration of that pivot delay, a signal is generated on the lead 154 which is transmitted to the input 156 of the main machine control 100 to cause the presser foot to be lifted. At the end of the pivot delay, a pulse is generated on the lead 158 which reset the flip flops 112 and 114, allowing the sew command on the lead 104 to take effect so that the seam 43 is now sewn, assuming that the operator has pivoted the work fabric.

Additionally, at the start of the pivot delay, a signal on the on the lead 160 which was generated when the flip flop 112 was set, causes the Johnson counter 162 to be incremented. The outputs of the Johnson counter 162 go through the switch bank 90 to the OR gate 164. The Johnson counter had previously been reset so that its output on the lead 166 was high. After the first seam, the output of the Johnson counter on the lead 168 is now high, all its other outputs being low. Since the first switch 91 is closed, the output of the OR gate 164 remains high.

The sewing of the seams 43 and 44 takes place in the same manner as described above with exception that the Johnson counter is incremented so that after seam 44 is sewn, a signal from the output 170 of the Johnson counter 162 passes through the closed switch 93. The seam 45 is then sewn in the same manner as described. However, at the end of the seam 45, when the flip flop 112 is set, the Johnson counter 162 is incremented so that its output 172 cannot pass through the switch 94, which is open. Therefore, a low signal appears at the output of the OR gate 164 to start the timer 174. When the timer 174 starts timing, a signal on the lead 176 sets the flip flop 116, placing a high on its output 178 which causes the sew command to the main machine control 100 to go high, stopping the sewing. The output 180 of the timer 174 generates a trim command to the main machine control 100 which causes the trim operation to occur. On this final seam, generation of the trim signal overrides the presser foot lift signal. At the same time, the Johnson counter 162 is reset. Sewing cannot continue because the flip flop 116 remains set until the operator resets the treadle to place a high signal on the lead 104. This occurs when the operator removes the work fabric because stitching has been completed.

Thus, the circuitry shown in FIG. 3 allows the operator to merely toe the treadle and guide the work fabric, with all other operations being done automatically. If, however, the operator desires to abort the procedure, a signal on the trim output lead 108 or the presser foot output lead 110 from the treadle control 102 will cause the procedure to be aborted.

It will be understood that the control system of this invention is not limited to use with pivot delay and trim and lock-out sequences as described in the preferred embodiment, nor is the system limited to use with only two different preestablished automatically effective sewing machine operations. Any sequence of sewing machine operations required to be performed at identifiable locations on a work piece, which locations are capable of being sensed, become likely candidates for an adaptation of the present invention. For instance, in turning a corner with a two-needle sewing machine for simultaneously sewing parallel lines of stitches, the heretofore operator influenced expedient of disengaging the inside needle for an interval before and after the pivot at the corner is ideally suited for accomplishment by this invention. A two-needle sewing machine with facility for selectively discontinuing endwise reciprocation of one of the needle bars for such cornering operation is disclosed in the Martell et al U.S. Pat. No. 4,403,558, dated Sept. 13, 1983, which is incorporated herein by reference. Such needle bar throw out may be effected by a signal on line 156 of the circuit shown in FIG. 3 in place of or in addition to the pivot delay operation described above.

A wide variety of different possible automatic sewing machine and appurtenance operations for use with this invention will occur to those skilled in the art. If more than two different operations are to be involved, however, it may be advantageous to change the specific form of the operational controller, for instances into a plurality of rows of single throw switches one row for selecting each of the different possible operations.

I claim:

1. In a sewing machine for performing a sewing operation involving a series of seam segments and having a reciprocatable needle for stitching material advanced in a feed direction, drive means for operating said sewing machine, and an operator influenced control for said drive means,
the improvement which comprises
material detection means mounted in front of said needle in the material feed direction for generating a signal in response to any change in the number of plies of material being advanced in the feed direction,
a first and a second means associated with said sewing machine each providing for a different automatically effective sewing machine operation,
means responsive to successive signals from said material detection means for initiating actuations of said first of said automatically effective sewing machine operations,
counter means indexed by each actuation of said first of said automatically effective sewing machine operations in response to said successive signals from said material detection means,
operator influenced means for selecting a defined count of said counter means,
and means effective after attainment of said defined count of said counter means for initiating actuation of said second of said automatically effective sewing machine operations in response to the next signal from said material detection means.

2. The sewing machine of claim 1 wherein said first means for providing automatically effective sewing machine operation includes stop motion mechanism for temporarily interrupting the sewing machine drive, needle positioning mechanism for stopping the sewing machine with the needle penetrating the material, and a presser lifting mechanism all operable in concert to provide for a sewing machine operation accommodating operator influenced turning of a sharp corner between seam segments.

3. The sewing machine of claim 2 wherein said first means for providing automatically effective sewing machine operation also includes an operator influencable time delay means for regulating the period of temporary interruption of the sewing machine drive.

4. The sewing machine of claim 1 wherein the second means for providing automatically effective sewing machine operation includes means for providing an indeterminate interruption of said sewing machine drive, thread trimming mechanism, and means responsive to subsequent operation of said operator influenced control for said drive means for terminating said interruption of said sewing machine drive.

5. In a sewing machine for performing a sewing operation involving a series of seam segments and having a pair of reciprocatable needles for producing parallel lines of stitches in material advanced in a feed direction, drive means for operating said sewing machine, and an operator influenced control for said drive means,
the improvement which comprises
material detection means mounted in front of said needles in the material feed direction for generating a signal in response to any change in the number of plies of material being advanced in the feed direction,
a first and a second means associated with said sewing machine each providing for a different automatically effective sewing machine operation,
said first means providing automatically effective sewing machine operation including means for interrupting and reestablishing reciprocation of one of said pair of needles, stop motion mechanism for temporarily interrupting the sewing machine drive, needle positioning mechanism for stopping the sewing machine with the other of said needles penetrating the material, and a presser lifting mechanism all operating in concert to provide for a sewing machine operation accommodating operator influenced turning of a sharp corner between seam segments, said second means providing automatically effective sewing machine operation including means for providing an indeterminate interruption of the sewing machine drive, means responsive to successive signals from said material detection means for initiating actuations of said first of said means providing automatically effective sewing machine operations, counter means indexed by each actuation of said first of said automatically effective sewing machine operations in response to said successive signals from said material detection means, operator influenced means for selecting a defined count of said counter means, and means effective after attainment of said defined count of said counter means for initiating actuation of said second of said means providing automatically effective sewing machine operation in response to the next signal from said material detection means.

* * * * *